(12) United States Patent
Zhu et al.

(10) Patent No.: US 12,549,042 B2
(45) Date of Patent: *Feb. 10, 2026

(54) MAGNETICALLY INSULATING STATOR LINER SYSTEM WITH INSULATOR HAVING FERRIMAGNETIC MATERIAL AND A WEDGE

(71) Applicant: Ford Global Technologies, LLC, Dearborn, MI (US)

(72) Inventors: Leyi Zhu, Novi, MI (US); Franco Leonardi, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 422 days.

This patent is subject to a terminal disclaimer.

(21) Appl. No.: 17/586,394

(22) Filed: Jan. 27, 2022

(65) Prior Publication Data

US 2023/0238838 A1    Jul. 27, 2023

(51) Int. Cl.
*H02K 1/14* (2006.01)
*H02K 1/02* (2006.01)
*H02K 29/08* (2006.01)

(52) U.S. Cl.
CPC ............... *H02K 1/148* (2013.01); *H02K 1/02* (2013.01); *H02K 29/08* (2013.01)

(58) Field of Classification Search
CPC .... H02K 3/487; H02K 3/522; H02K 2203/12; H02K 3/30; H02K 3/325; H02K 3/32; H02K 3/34
USPC .................................................. 310/215, 214
See application file for complete search history.

(56) References Cited

U.S. PATENT DOCUMENTS

| | | | |
|---|---|---|---|
| 3,255,512 A | 6/1966 | Lochner et al. | |
| 4,161,669 A * | 7/1979 | Aimar ..................... | H02K 3/522 310/260 |
| 4,429,240 A | 1/1984 | Kishi | |
| 5,258,681 A * | 11/1993 | Hibino .................... | H02K 3/493 310/214 |
| 5,852,335 A * | 12/1998 | Suzuki ..................... | H02K 3/522 310/194 |
| 6,008,563 A * | 12/1999 | Baba ........................ | H02K 1/146 310/194 |
| 6,414,413 B1 * | 7/2002 | Arai ......................... | H02K 1/165 310/214 |
| 8,987,970 B2 * | 3/2015 | Uchida .................... | H02K 3/487 310/214 |
| 9,300,179 B2 * | 3/2016 | Sawada .................... | H02K 3/30 |
| 10,483,811 B2 * | 11/2019 | Sturm ...................... | H02K 1/146 |

(Continued)

OTHER PUBLICATIONS

Permeability Electromagnetism Table Wiki, 2023.*
Ferrites_Wikipedia.*
Permeability_Electromagnetism_Wikipedia.*

*Primary Examiner* — Maged M Almawri
(74) *Attorney, Agent, or Firm* — David B. Kelley; Brooks Kushman P.C.

(57) ABSTRACT

A stator includes a core and a molded midsection arranged to define a plurality of slots. The stator also includes a plurality of conductors wound within the slots. Portions of the midsection immediately adjacent to the slots include magnetic insulator embedded therein. The magnetic insulator is electrically insulating and has ferrimagnetic ordering. The stator further includes a plurality of non-magnetic wedges disposed between the conductors and an inner diameter surface of the stator.

17 Claims, 4 Drawing Sheets

(56) References Cited

U.S. PATENT DOCUMENTS

| | | | | |
|---|---|---|---|---|
| 10,848,016 | B2* | 11/2020 | Shiohara | H02K 1/146 |
| 11,258,327 | B2* | 2/2022 | Kinouchi | H01F 1/055 |
| 2002/0074889 | A1* | 6/2002 | Kikuchi | H02K 3/24 |
| | | | | 310/214 |
| 2002/0074892 | A1* | 6/2002 | Lindbery | H02K 1/165 |
| | | | | 310/216.004 |
| 2004/0207284 | A1* | 10/2004 | Neet | H02K 3/48 |
| | | | | 310/215 |
| 2009/0085421 | A1* | 4/2009 | Saito | H02K 3/12 |
| | | | | 310/214 |
| 2009/0195108 | A1* | 8/2009 | Rippel | H02K 3/48 |
| | | | | 310/58 |
| 2009/0243408 | A1* | 10/2009 | Ueta | H02K 3/522 |
| | | | | 310/71 |
| 2009/0289520 | A1* | 11/2009 | Takeshita | H02K 3/487 |
| | | | | 310/214 |
| 2011/0215660 | A1* | 9/2011 | Goto | H02K 5/203 |
| | | | | 310/53 |
| 2012/0080976 | A1* | 4/2012 | Oka | H02K 3/522 |
| | | | | 310/215 |
| 2013/0115064 | A1* | 5/2013 | Kimura | H02K 3/522 |
| | | | | 415/177 |
| 2015/0076954 | A1* | 3/2015 | Johnson | H02K 3/345 |
| | | | | 310/214 |
| 2018/0138760 | A1* | 5/2018 | Kim | H02K 1/148 |
| 2020/0177057 | A1* | 6/2020 | Uryu | H02K 1/16 |
| 2020/0259383 | A1* | 8/2020 | Goetz | H02K 3/30 |
| 2021/0249926 | A1* | 8/2021 | Enomoto | H02K 3/34 |
| 2022/0006344 | A1* | 1/2022 | Sumitomo | H02K 3/14 |
| 2022/0216743 | A1* | 7/2022 | Leonardi | H02K 1/20 |
| 2022/0320917 | A1* | 10/2022 | Shirazee | H02K 21/22 |

\* cited by examiner

PRIOR ART

MAGNETICALLY INSULATING STATOR LINER SYSTEM WITH INSULATOR HAVING FERRIMAGNETIC MATERIAL AND A WEDGE

TECHNICAL FIELD

The present disclosure relates to electric machine construction.

BACKGROUND

Extended drive range technology for electric vehicles, such as battery electric vehicles and plug in hybrid vehicles, continually increases demand on electric machines used for vehicle propulsion. Achieving high performance may require traction batteries and electric machines to have higher power outputs. One way to achieve a higher power output is to increase the flux carrying capabilities of a stator, thereby increasing its torque producing capabilities.

SUMMARY

An electric machine includes a stator with a core and a midsection arranged to define a plurality of slots, and a plurality of conductors wound within the slots. Portions of the midsection immediately adjacent to the slots include electrically insulating material with ferrimagnetic ordering.

A stator includes a core and a molded midsection arranged to define a plurality of slots. The stator also includes a plurality of conductors wound within the slots. Portions of the midsection immediately adjacent to the slots include a magnetic insulator. The magnetic insulator is electrically insulating and has ferrimagnetic ordering. The stator further includes a plurality of non-magnetic wedges disposed between the conductors and an inner diameter surface of the stator.

A stator includes a core having a coating thereon and defining a plurality of slots, and a plurality of conductors wound within the slots. Portions of the coating immediately adjacent to the slots include electrically insulating material with ferrimagnetic ordering.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric vehicles typically include one or more electric machines. The electric machine may be referred to as an electric motor, a traction motor, or a generator. The electric machine may be a permanent magnet machine or an induction machine. Depending on the operating conditions, the electric machine may be capable of working as a motor or a generator. For example, the electric machine may provide torque for vehicle propulsion or act as a generator for converting mechanical power into electrical power using regenerative breaking technology. The electric machine may also provide reduced pollutant emissions since electric vehicles may be operated in either electric mode or hybrid mode to reduce vehicle fuel consumption. While the present disclosure is described in the context of an electric vehicle, it is to be understood that it may be used in connection with nonautomotive applications. For example, the disclosed electric machine may be used in manufacturing equipment or power-generation machines.

Figure 1:
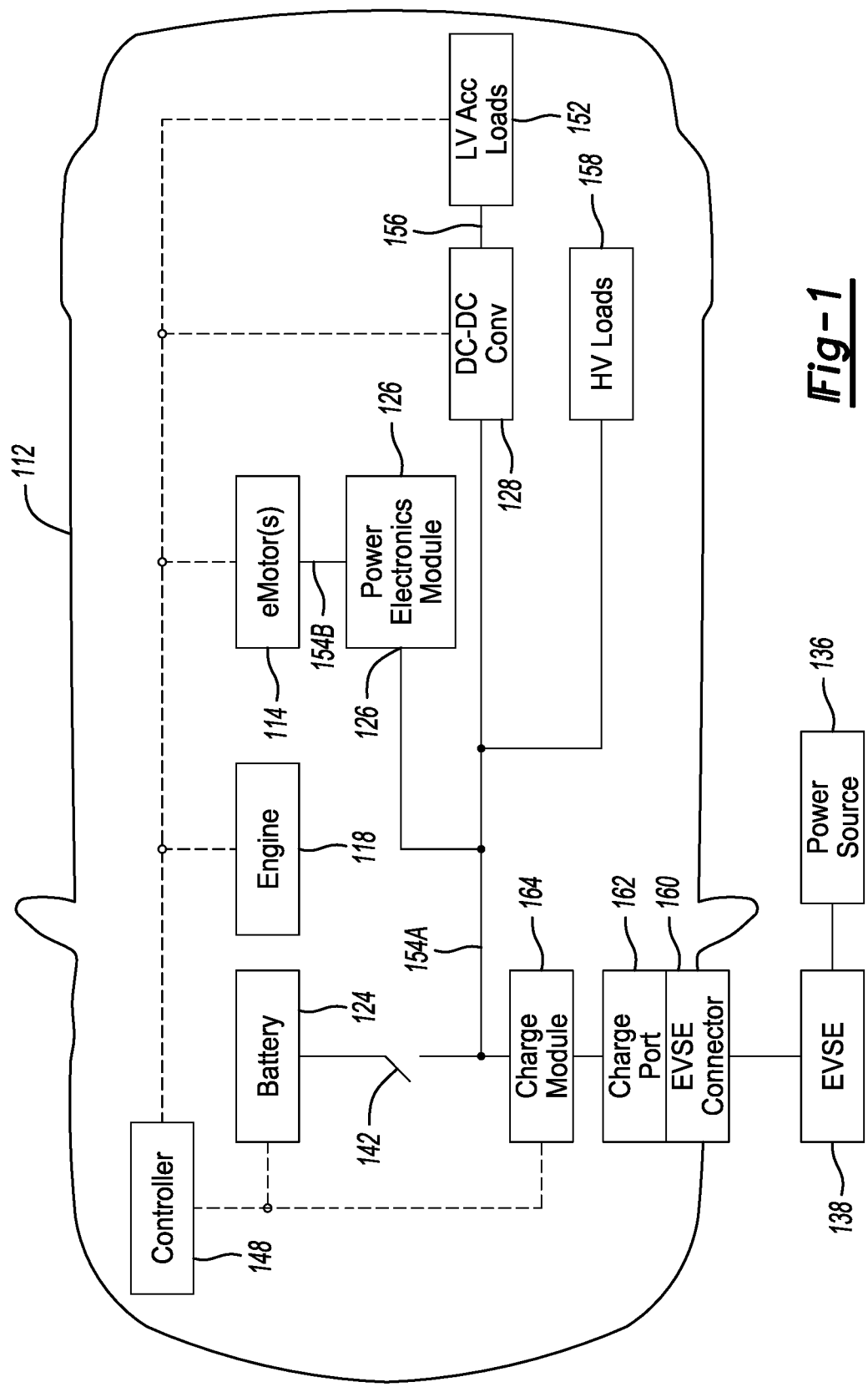
FIG. 1 is a schematic diagram of an example electric vehicle.

FIG. 1 depicts a Hybrid Electric Vehicle ("HEV") 112. The HEV 112 includes an electrified propulsion system having one or more electric machines 114 mechanically coupled to a hybrid transmission (not shown). In addition, the hybrid transmission is mechanically coupled to an internal combustion engine 118 (i.e., ICE). The electric machines 114 are arranged to provide propulsion torque as well as slowing torque capability either while the engine 118 is operated or turned off. When the engine 118 is off, the HEV 112 may be operated in an electric-only drive mode using the electric machines 114 as the sole source of propulsion. The hybrid transmission is also mechanically coupled to road wheels to output torque from the electric machines 114 and/or combustion engine 118.

A traction battery or battery pack 124 stores energy that can be used to power the electric machines 114. The battery pack 124 provides a high-voltage direct current (DC) output. One or more contactors 142 may isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high voltage bus 154B and the electric machines 114. According to some examples, the traction battery 124 may provide a DC current while the electric machines 114 operate using a three-phase alternating current (AC). The power electronics module 126 may convert the DC current to a three phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 112 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery (e.g., 12V battery). The low-voltage loads 152 may be electrically coupled to the low-voltage bus 156. The low-voltage loads 152 may include various controllers within the vehicle 112. One or more high-voltage electrical loads 158 may be coupled to the high-voltage bus 154A. The high-voltage electrical loads 158 may further include compressor and electric heaters.

The traction battery 124 may be recharged by an off-board power source 136. The off-board power source 136 may be a connection to an electrical outlet. The external power source 136 may be electrically coupled to a charger or another type of electric vehicle supply equipment (EVSE) 138. The off-board power source 136 may be an electrical power distribution network or grid as provided by an electric utility company. The EVSE 138 provides circuitry and controls to manage the transfer of energy between the power source 136 and the vehicle 112. The off-board power source 136 may provide DC or AC electric power to the EVSE 138. The EVSE 138 may have a charge connector 160 for plugging into a charge port 162 of the vehicle 112. The charge port 162 may be electrically coupled to an on-board power conversion module or a charge module 164. The charge module 164 may condition the power supplied from the EVSE 138 to provide proper voltage and current levels to the traction battery 124.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components such as governing electrical flow to and from the one or more electric machines.

Figure 2:
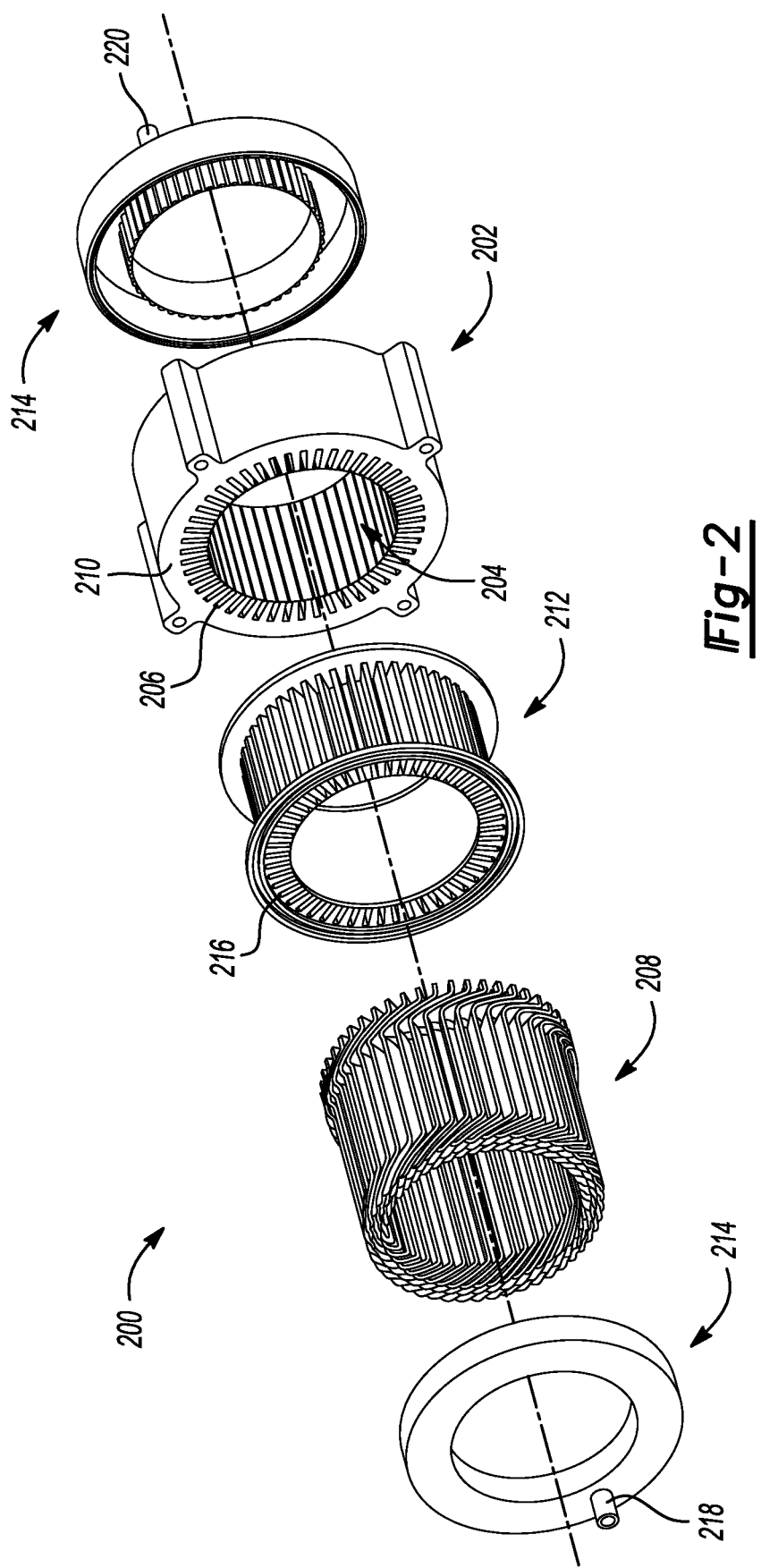
FIG. 2 is an exploded assembly view of a disassembled stator.

An electric machine may comprise a stator and a rotor, for example, for propulsion of an electric vehicle. FIG. 2 depicts an exploded view of a disassembled stator 200. The stator 200 may comprise a plurality of laminations (not shown) having a front side and a back side. When stacked, the front and back sides are disposed against adjacent front and back sides to form a stator core 202. Each lamination also includes an outer diameter (or outer wall) and an inner diameter (or inner wall). The outer diameters cooperate to define an outer surface of the stator 200, and the inner diameters cooperate to define a cavity 204.

The stator core 202 may include a number of slots 206 spaced about a circumference of the stator core 202. A plurality of windings (also known as coils, wires, or conductors) 208 may be wrapped around the stator 200 and are disposed within the stator slots 206. The windings 208 may be routed throughout the slots 206 in a serpentine fashion to create one or more winding paths to transmit current through the stator 200. Based on the arrangement of the windings 208, portions of the windings may protrude from an end face 210 of the stator core 202. In some specific examples, the windings 208 comprise copper hairpin windings that are routed throughout an iron alloy stator core. A plurality of individual hairpins may be inserted axially through slots 206 and have end portions that protrude beyond end face 210 to adjoin hairpins in adjacent slots.

The stator 200 may also include a midsection 212 formed about the stator core 202 via a coating or molding process. That is, the midsection 212 may be a coating on the stator core 202 deposited for example via electrophoretic deposition, or an in-situ transfer molded or injection molded component of a polymeric material that matches the shape and features of the stator core 202. The midsection 212 includes slots 216 arranged to correspond to the slots 206 of the stator core 202 defining substantially rectangular slots to house the windings 208. In some embodiments, the polymeric material used may be epoxy, nylon, or synthetic rubber.

While the electric machine operates as a motor, current supplied to the windings 208 generates an electromechanical field urging rotation of the rotor. While the electric machine operates as a generator, current is generated in the windings 208 from inertial rotation of the rotor, and energy may be stored in the battery and/or utilized to power other vehicle components. During operation of the electric machine both as a motor and as a generator, heat may be generated throughout the stator core 202 and windings 208. This heat may be removed from the electric machine using a cooling medium (e.g., by circulating transmission oil or other suitable cooling mediums). The cooling medium (or coolant) reduces the temperature of the windings 208 and the stator core 202 thereby allowing the stator to facilitate passage of higher electrical current load without causing an undesirable degree of heat generation.

A thermal management assembly may be used to facilitate the cooling medium. Accordingly, the electric machine may include a thermal management assembly that introduces an oil or other dielectric fluid to portions of the electric machine for cooling purposes. In some examples, the oil may be dripped or sprayed onto wires or windings of the electric machine. However, non-uniformity of coolant flow as applied to the windings may reduce cooling efficacy. An air-cooled thermal management assembly may alternatively be provided to assist in managing thermal conditions of the electric machine. Airflow cooling may require a fan or blower to be in fluid flow connection to the end windings to push air thereto for cooling purposes. Such a configuration may also require additional components such as ducting that consumes package space.

To address these drawbacks, a closed coolant channel assembly may be provided to assist in managing thermal conditions of the windings of the electric machine. In some specific examples, the closed coolant channel assembly may be formed from one or more injection molded polymeric components and mounted to the stator 200. In some embodiments, the closed coolant channel assembly is formed from an injection molded polymer. The closed coolant channel assembly may define an internal cavity arranged to direct coolant flow to be in thermal communication with the windings 208. In some optional embodiments for example, a pair of end caps 214 may be provided near the end face 210 of the stator 200. The end caps 214 and the stator core 202 may be arranged with respect to one another to create a fluid seal therebetween and such that coolant routed through a channel is contained therein. In some embodiments, the end caps 214 may include one or more inlet ports 218 to receive a coolant flow from a reservoir or other source, and one or more outlet ports 220 to exhaust coolant from the electric machine thermal management system. Coolant flow into the stator 200 allows heat removal from the end portions of the windings 208 that protrude beyond the end face 210 of the stator core 202.

Since these enhanced cooling capabilities may increase the heat removal efficiency, the stator may be able to accommodate additional electrical current loads without heat degradation concerns. For example, the stator teeth (i.e., portions of the core directly adjacent to stator slots) may be made larger to increase the flux carrying capabilities of the stator. Larger stator teeth, however, may shrink the slots and reduce the space available for conductors. Smaller space available for conductors may mean less material such as copper that contributes directly to torque production. Furthermore, slot liners, conventionally used to provide isolation between the conductors (such as copper) and the core (such as silicone steel core) may further reduce the space available in the slots.

Figure 3:
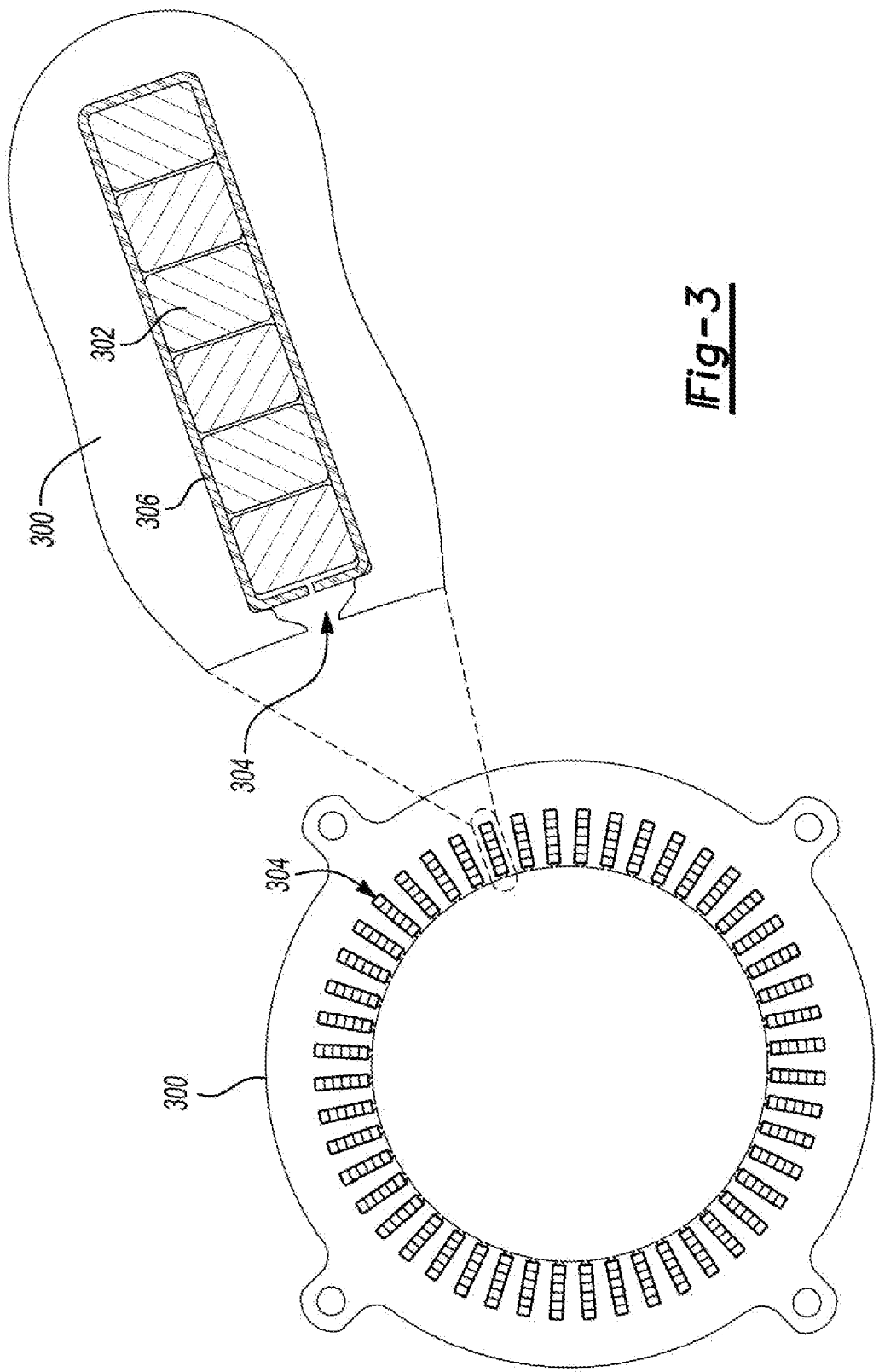
FIG. 3 is a plan view of a conventional stator slot.

FIG. 3, for example, shows a conventional stator 300 comprising at least one winding 302, at least one stator slot 304, and at least one slot liner 306 to provide insulation between the at least one winding 302 and the stator 300. The at least one slot liner 306 may be made of multiple layers of specialized paper, plastic, or the like for optimal dielectric and mechanical strength. To maximize efficiency, typically, only a minimum clearance necessary to insert the conductors 302 is left as free space.

To remedy one or more of the above-mentioned potential issues, an electrically insulating material with ferrimagnetic ordering (e.g., suitable ferrite powder) may be used as the coating or added to the midsection discussed above. This material may have a relative magnetic permeability of 10 to 20000. In some embodiments, the ferrimagnetic material may include cobalt ferrites, cobalt nickel zinc ferrites, magnesium manganese zinc ferrites, manganese zinc ferrites, nickel ferrites, nickel zinc ferrites, yttrium iron garnet, or combinations thereof. The midsection, if molded, may be formed from an injection or transfer molded polymer.

Figure 4:
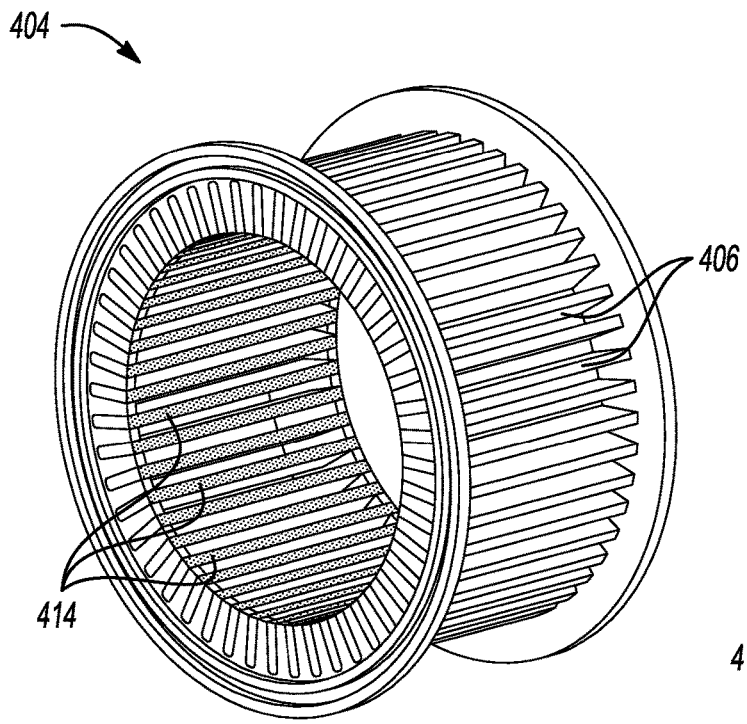
FIG. 4 is a perspective view of a transfer molded midsection.

FIG. 4 shows a perspective view of a midsection 404. The midsection 404 may be formed from a combination of a polymer (or a plurality of polymers) and a ferrite powder. In one embodiment, the polymer used for forming the transfer molded midsection 404 may be epoxy as mentioned above. In addition to molding by mixing polymers with ferrite powder, the midsection 404 magnetic insulator liner can also be made by ferrite coating the stator using electrophoretic deposition.

The midsection 404 of FIG. 4 may comprise a plurality of slots 406 arranged to correspond to slots of the stator core (not shown) to house windings (not shown). The midsection 404 may further comprise a plurality of non-magnetic wedges 414 disposed at a short end of the slots 406 proximal to the center of the stator such that, once assembled, the non-magnetic wedges 414 may be disposed between the conductors and an inner diameter surface of the stator. Once assembled, the wedges 414 coupled to the transfer molded midsection 404 may entirely encase the windings. In some embodiments, the wedges 414 may be in direct contact with the conductors. The wedges 414 may be transfer molded to the midsection 404 in a two-step process or inserted prior as a separate wedge. In some embodiments, the wedges 414 may be plastic. In some embodiments, a width of the non-magnetic wedges 414 immediately adjacent to the conductors is greater than a width of the non-magnetic wedges 414 adjacent to the inner diameter surface. In some embodiments, a material of the midsection 404 may be different than a material of the non-magnetic wedges 414.

In some embodiments, some portions of the midsection may be free of the electrically insulating material with ferrimagnetic ordering to avoid increasing slot leakage inductance unnecessarily. In other words, distribution of the material may be uniform or nonuniform. In some embodiments, portions of the midsection 404 immediately adjacent to the slots 406 may have ferrite powder embedded therein such that these portions have a magnetic permeability greater than other portions of the midsection 404 which lack the ferrite powder. The regions to avoid flux leakage and lack ferrite (to have a low permeability) may correspond to the non-magnetic wedges 414.

Figure 5:
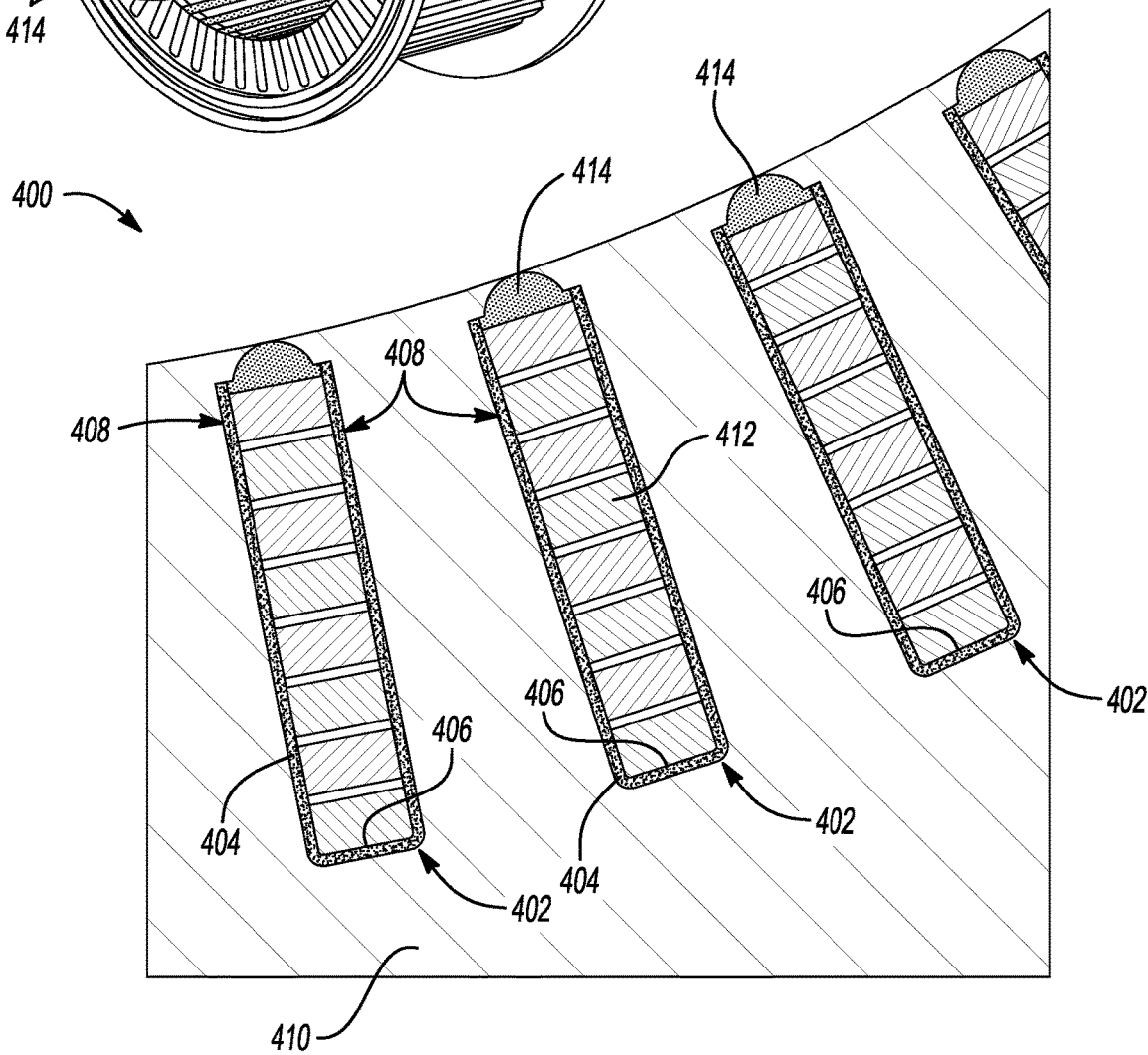
FIG. 5 is a cross sectional view of a portion of a stator.

FIG. 5 shows a cross sectional view of a subsection of a stator 400 illustrating a detailed view of a plurality of stator slots 402. In some embodiments, the midsection 404 may comprise a plurality of the midsection slots 406 corresponding to a plurality of stator core slots 408 collectively defining the plurality of stator slots 402. Accordingly, the stator slots 402 may be defined from the coupling of the midsection 404 to a stator core 410. In some embodiments, the midsection 404 may further comprise a plurality of non-magnetic wedges 414 disposed at a short end of the stator slots 402 proximal to the center of the stator 400. In other words, the plurality of non-magnetic wedges 414 may be disposed between the conductors 412 and an inner diameter surface of the stator 400.

In some embodiments such as that shown in FIG. 5, the midsection 404 may replace a conventional slot liner commonly made from specialized paper. Accordingly, one advantage of the present disclosure may be that replacing the slot liners with the midsection 404 may result in improved thermal transfer between the conductors 412 and the stator core 410. This may be because thermal conductivity of the electrically insulating material with ferrimagnetic ordering is greater than conventional slot liners. The high magnetic permeability and additional magnetic flux of the material may also increase the flux carrying capability of the stator, resulting in higher torque capability.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, strength, durability, life cycle, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   a stator including a core and a midsection on the core arranged to define a plurality of slots, and a plurality of conductors wound within the slots, wherein portions of the midsection immediately adjacent to the slots and conductors include electrically insulating material with ferrimagnetic ordering and other portions of the midsection lack the electrically insulating material with ferrimagnetic ordering.

2. The electric machine of claim 1, wherein the electrically insulating material includes cobalt ferrites, cobalt nickel zinc ferrites, magnesium manganese zinc ferrites, manganese zinc ferrites, nickel ferrites, nickel zinc ferrites, yttrium iron garnet, or combinations thereof.

3. The electric machine of claim 1, wherein a relative magnetic permeability of the electrically insulating material is 10 to 20000.

4. The electric machine of claim 1, wherein the midsection includes epoxy, nylon, or synthetic rubber.

5. The electric machine of claim 1, wherein the stator further includes a plurality of non-magnetic wedges disposed between the conductors and an inner diameter surface of the stator.

6. The electric machine of claim 5, wherein a width of the non-magnetic wedges adjacent to the conductors is greater than a width of the non-magnetic wedges adjacent to the inner diameter surface.

7. A stator comprising:
a core;
a molded midsection, wherein the core and the molded midsection are arranged to define a plurality of slots;
a plurality of conductors wound within the slots, wherein portions of the midsection immediately adjacent to the slots include ferrite powder embedded therein and wherein the ferrite powder is electrically insulating and has ferrimagnetic ordering; and
a plurality of non-magnetic wedges disposed between the conductors and an inner diameter surface of the stator.

8. The stator of claim 7, wherein the ferrite powder includes cobalt ferrites, cobalt nickel zinc ferrites, magnesium manganese zinc ferrites, manganese zinc ferrites, nickel ferrites, nickel zinc ferrites, yttrium iron garnet, or combinations thereof.

9. The stator of claim 7, wherein a relative magnetic permeability of the ferrite powder is 10 to 20000.

10. The stator of claim 7, wherein a material of the molded midsection includes epoxy, nylon, or synthetic rubber.

11. The stator of claim 7, wherein a width of the non-magnetic wedges adjacent to the conductors is greater than a width of the non-magnetic wedges adjacent to the inner diameter surface.

12. The stator of claim 7, wherein a material of the molded midsection is different than a material of the non-magnetic wedges.

13. A stator comprising:
a core having a coating thereon and defining a plurality of slots;
a plurality of conductors wound within the slots, wherein portions of the coating immediately adjacent to the slots include electrically insulating material with ferrimagnetic ordering; and
a plurality of non-magnetic wedges disposed between the conductors and an inner diameter surface of the core, wherein a width of the non-magnetic wedges adjacent to the conductors is greater than a width of the non-magnetic wedges adjacent to the inner diameter surface.

14. The stator of claim 13, wherein the electrically insulating material is distributed uniformly along the slots.

15. The stator of claim 13, wherein the electrically insulating material includes cobalt ferrites, cobalt nickel zinc ferrites, magnesium manganese zinc ferrites, manganese zinc ferrites, nickel ferrites, nickel zinc ferrites, yttrium iron garnet, or combinations thereof.

16. The stator of claim 13, wherein a relative magnetic permeability of the electrically insulating material is 10 to 20000.

17. The stator of claim 13, wherein the non-magnetic wedges are in direct contact with some of the conductors.

* * * * *